(12) United States Patent
Venkataraman

(10) Patent No.: US 9,619,364 B2
(45) Date of Patent: Apr. 11, 2017

(54) GROUPING AND ANALYSIS OF DATA ACCESS HAZARD REPORTS

(71) Applicant: NVIDIA Corporation, Santa Clara, CA (US)

(72) Inventor: Vyas Venkataraman, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 269 days.

(21) Appl. No.: 14/012,270

(22) Filed: Aug. 28, 2013

(65) Prior Publication Data

US 2014/0281727 A1    Sep. 18, 2014

Related U.S. Application Data

(60) Provisional application No. 61/785,067, filed on Mar. 14, 2013.

(51) Int. Cl.
*G06F 9/44* (2006.01)
*G06F 11/36* (2006.01)
*G06F 9/46* (2006.01)

(52) U.S. Cl.
CPC ...... *G06F 11/3632* (2013.01); *G06F 11/3604* (2013.01); *G06F 9/46* (2013.01)

(58) Field of Classification Search
CPC ..... G06F 11/3632; G06F 11/3604; G06F 9/46
See application file for complete search history.

(56) References Cited

U.S. PATENT DOCUMENTS

| 5,765,036 A | 6/1998 | Lim | |
| 5,970,241 A * | 10/1999 | Deao | G06F 11/3632 712/227 |
| 6,343,371 B1 * | 1/2002 | Flanagan | G06F 9/526 700/17 |
| 6,571,320 B1 | 5/2003 | Hachmann | |

(Continued)

FOREIGN PATENT DOCUMENTS

WO    WO2006115769    11/2006

OTHER PUBLICATIONS

Cyrille Artho et al., "Using Block-Local Atomicity to Detect Stale-Value Concurrency Errors" [Online], 2004, pp. 150-164, [Retrieved from Internet on Aug. 8, 2016], <http://download.springer.com/static/pdf/613/chp%253A10.1007%252F978-3-540-30476-0_16.pdf>.*

(Continued)

*Primary Examiner* — Thuy Dao
*Assistant Examiner* — Ziaul A Chowdhury

(57) ABSTRACT

A method for analyzing race conditions between multiple threads of an application is disclosed. The method comprises accessing hazard records for an application under test. It further comprises creating a graph comprising a plurality of vertices and a plurality of edges using the hazard records, wherein each vertex of the graph comprises information about a code location of a hazard and wherein each edge of the graph comprises hazard information between one or more vertices. Additionally, it comprises assigning each edge with a weight, wherein the weight depends on a number and relative priority of hazards associated with a respective edge. Finally, it comprises traversing the graph to report an analysis record for each hazard represented in the graph.

22 Claims, 10 Drawing Sheets

(56) References Cited

U.S. PATENT DOCUMENTS

| | | | |
|---|---|---|---|
| 7,065,630 B1 | 6/2006 | Ledebohm et al. | |
| 7,366,956 B2 | 4/2008 | Karp et al. | |
| 7,516,446 B2 | 4/2009 | Choi et al. | |
| 7,549,150 B2 | 6/2009 | Yu | |
| 7,584,332 B2 | 9/2009 | Kogge et al. | |
| 7,673,181 B1* | 3/2010 | Lindo | G06F 11/3612 714/38.13 |
| 7,757,237 B2 | 7/2010 | Karp et al. | |
| 7,992,146 B2 | 8/2011 | Krauss | |
| 8,028,133 B2 | 9/2011 | Dice et al. | |
| 8,095,750 B2 | 1/2012 | Heller, Jr. | |
| 8,117,403 B2 | 2/2012 | Heller, Jr. et al. | |
| 8,296,743 B2 | 10/2012 | Linderman et al. | |
| 8,321,637 B2 | 11/2012 | Baum et al. | |
| 8,375,368 B2 | 2/2013 | Tuck et al. | |
| 8,448,156 B2 | 5/2013 | Demetriou et al. | |
| 9,454,460 B2* | 9/2016 | Yang | G06F 11/3632 |
| 2003/0131283 A1* | 7/2003 | Ur | G06F 11/3672 714/36 |
| 2003/0145124 A1* | 7/2003 | Guyan | G06F 9/46 719/318 |
| 2003/0210248 A1 | 11/2003 | Wyatt | |
| 2003/0236951 A1* | 12/2003 | Choi | G06F 11/3632 711/150 |
| 2005/0015752 A1* | 1/2005 | Alpern | G06F 11/3604 717/131 |
| 2005/0071813 A1* | 3/2005 | Reimer | G06F 11/3604 717/125 |
| 2005/0273570 A1 | 12/2005 | DeSouter et al. | |
| 2005/0283781 A1* | 12/2005 | Karp | G06F 11/3624 718/100 |
| 2006/0218553 A1 | 9/2006 | Dore et al. | |
| 2006/0224858 A1 | 10/2006 | Wang et al. | |
| 2006/0225056 A1* | 10/2006 | Mukkavilli | G06F 11/3604 717/141 |
| 2006/0259691 A1* | 11/2006 | Jeremiassen | G06F 12/0806 711/118 |
| 2007/0011671 A1* | 1/2007 | Kahlon | G06F 11/3608 717/170 |
| 2007/0245312 A1* | 10/2007 | Qadeer | G06F 11/3632 717/124 |
| 2008/0028181 A1 | 1/2008 | Tong et al. | |
| 2008/0209436 A1* | 8/2008 | Agha | G06F 11/3632 718/106 |
| 2008/0301657 A1* | 12/2008 | Bowler | G06F 8/443 717/158 |
| 2008/0312095 A1* | 12/2008 | Kirovski | G06F 19/24 506/9 |
| 2009/0007087 A1* | 1/2009 | Ito | G06F 11/3604 717/156 |
| 2009/0019451 A1* | 1/2009 | Matsuzaki | G06F 11/3604 718/107 |
| 2010/0118041 A1 | 5/2010 | Chen et al. | |
| 2010/0138376 A1 | 6/2010 | Avis et al. | |
| 2010/0153934 A1 | 6/2010 | Lachner | |
| 2010/0250809 A1 | 9/2010 | Ramesh et al. | |
| 2011/0078427 A1 | 3/2011 | Shebanow et al. | |
| 2011/0145650 A1* | 6/2011 | Krauss | G06F 11/3604 714/38.1 |
| 2011/0167412 A1* | 7/2011 | Kahlon | G06F 11/3624 717/128 |
| 2011/0185359 A1* | 7/2011 | Chakrabarti | G06F 9/466 718/101 |
| 2011/0314458 A1 | 12/2011 | Zhu et al. | |
| 2012/0059997 A1* | 3/2012 | Cho | G06F 11/3632 711/150 |
| 2012/0198178 A1 | 8/2012 | Cox et al. | |
| 2012/0210320 A1* | 8/2012 | Goetz | G06F 9/46 718/100 |
| 2013/0036408 A1 | 2/2013 | Auerbach et al. | |
| 2013/0086564 A1 | 4/2013 | Felch | |
| 2013/0238938 A1* | 9/2013 | Baliga | G06F 11/3632 714/38.1 |
| 2013/0262784 A1 | 10/2013 | Asaro et al. | |
| 2013/0304996 A1 | 11/2013 | Venkataraman et al. | |
| 2013/0305252 A1 | 11/2013 | Venkataraman et al. | |
| 2014/0049551 A1 | 2/2014 | Rao et al. | |
| 2014/0137130 A1* | 5/2014 | Jacob | G06F 9/46 718/103 |
| 2014/0359625 A1* | 12/2014 | Bhagwan | G06F 11/3632 718/100 |
| 2015/0206272 A1 | 7/2015 | Perelygin et al. | |
| 2015/0206277 A1 | 7/2015 | Rao et al. | |
| 2016/0011857 A1 | 1/2016 | Grover et al. | |
| 2016/0179775 A1* | 6/2016 | Desai | G06F 17/2785 715/230 |
| 2016/0188251 A1 | 6/2016 | Dunning et al. | |

OTHER PUBLICATIONS

Tom Bergan et al., "CoreDet: A Compiler and Runtime System for Deterministic Multithreaded Execution", [Online], 2010, pp. 53-64, [Retreived from Internet on Aug. 8, 2016], <http://delivery.acm.org/10.1145/1740000/1736029/p53-bergan.pdf>.*

Milos Prvulovic, "CORD: Costeffective (and nearly overheadfree) OrderRecording and Data race detection", [Online], 2006, pp. 1-12, [Retreived from Internet on Aug. 8, 2016], <http://www.cc.gatech.edu/fac/milos/prvulovic_hpca06.pdf>.*

Cormac Flanagan et al., "FastTrack: Efficient and Precise Dynamic Race Detection", [Online], 2010, pp. 93-101, [Retreived from Internet on Aug. 8, 2016], <http://delivery.acm.org/10.1145/1840000/1839699/p93-flanagan.pdf>.*

Caitlin Sadowski et al. "SingleTrack: A Dynamic Determinism Checker for Multithreaded Programs", [Online], 2009, pp. 394-409, [Retreived from Internet on Nov. 20, 2016], <http://download.springer.com/static/pdf/564/chp%253A10.1007%252F978-3-642-00590-9_28.pdf>.*

Christoph von Praun et al., "Object Race Detection", [Online], ACM 2001, pp. 70-82, [Retrieved from Interent on Nov. 20, 2016], <http://delivery.acm.org/10.1145/510000/504288/p70-von_praun.pdf>.*

Yuan Yu et al., "RaceTrack: Efficient Detection of Data Race Conditions via Adaptive Tracking", [Online], 2005, pp. 1-14, [Retreived from Internet on Nov. 20, 2016], <https://pdfs.semanticscholar.org/4480/8fd8f2ffd19bb266708b8de835c28f5b8596.pdf>.*

Paul Sack et al., "Accurate and Efficient Filtering for the Intel Thread Checker Race Detector", [Online], ACM2006, pp. 34-41, [Retreived from Internet on Nov. 20, 2016], <http://delivery.acm.org/10.1145/1190000/1181315/p34-sack.pdf>.*

"Memory Management" (by Wordpress in 2008).

Butelle et al. "A Model for Coherent Distributed Memory for Race Condition Detection", 2011 IEEE, pp. 584-590.

Higuera-Toledano "Towards an Analysis of Race Carrier Conditions in Real-time Java", "A Model for Coherent DistributedMemory for Race Condition Detection", 2006 IEEE, pp. 1-7.

Sathiyamurthy et al. "Automated Reasoning Tool for the Detection of Race Conditions in Web Services", 2007 IEEE, pp. 61-65.

Ueng, et al., "CUDA-lite: Reducing GPU programming complexity," Journal (2008) Vol (5335): pp. 10-24. Springer-Verlag Berlin Heidelberg.

* cited by examiner

Remove Self Loops and Report

Get Connected Component

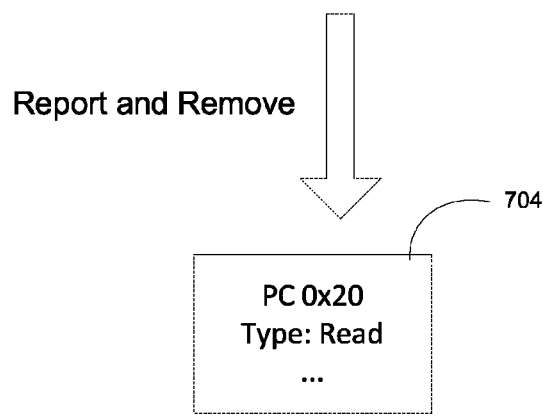
FIG. 7E
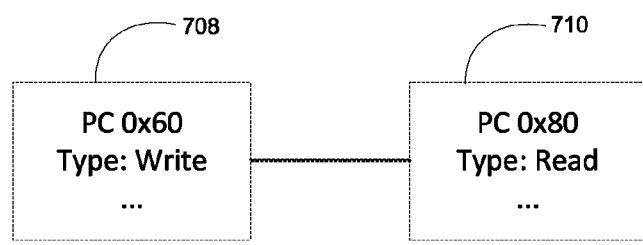
FIG. 7F
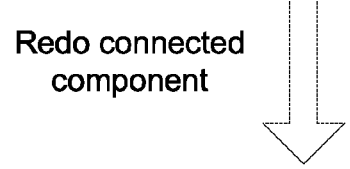
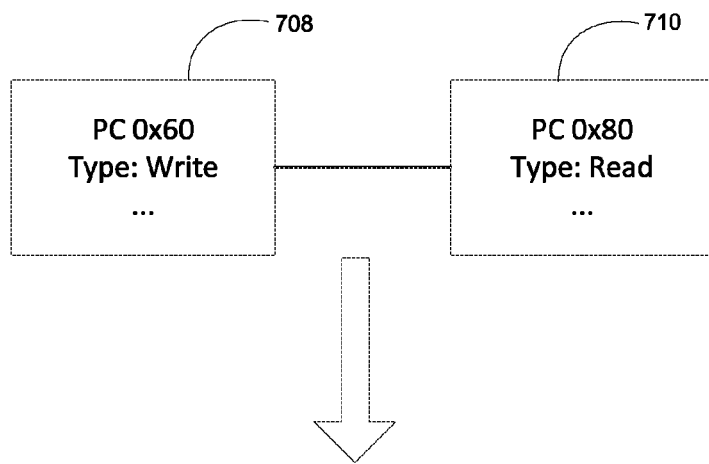
To FIG. 7G

GROUPING AND ANALYSIS OF DATA ACCESS HAZARD REPORTS

CROSS REFERENCE TO RELATED APPLICATIONS

This application is a conversion of and claims priority to and the benefit of Provisional Patent Application No. 61/785,067, entitled "GROUPING AND ANALYSIS OF DATA ACCESS HAZARD REPORTS," having a filing Date of Mar. 14, 2013, which is herein incorporated by reference in its entirety.

This application is related to concurrently filed patent application Ser. No. 13/728,990, entitled "METHOD AND SYSTEM FOR RUN TIME DETECTION OF SHARED MEMORY DATA ACCESS HAZARDS,"having a filing date of Dec. 27, 2012, which is herein incorporated by reference in its entirety.

This application is related to concurrently filed patent application Ser. No. 13/728,968, entitled "METHOD AND SYSTEM FOR HETEROGENEOUS FILTERING FRAMEWORK FOR SHARED MEMORY DATA ACCESS HAZARD REPORTS,"having a filing date of Dec. 27, 2012, which is herein incorporated by reference in its entirety.

BACKGROUND

In a multi-threaded environment, race conditions related to shared memory access can result in incorrect values being computed or in incorrect program execution. A data access hazard occurs when two or more accesses (e.g., read and/or write) to the same location in memory may occur without any guarantee of ordering between the accesses. When one ordering of thread accesses to the memory location may provide a first result, whereas a different ordering of thread accesses may provide a different, second result, this is referred to as a data race condition.

In the case of multi-threaded processing environments, the large number of simultaneous executing threads increase the possibility of creating such race conditions or errors. That is, a processor system may include an operating system that controls hardware resources that access a common memory location when executing a program. For instance, a general purpose GPU (GPGPU) programming environment may include thousands of GPGPUs, each running tens of thousands of threads, processing the same code in order to reach a result, such as, rendering a graphical image. These large numbers of threads are susceptible to race conditions that may be propagated throughout the computation, especially if all the GPGPUs are executing identical code.

Traditional race detection schemes rely on static analysis using symbolic evaluation of all possible execution paths to perform detection of potential hazards. However, not all such execution paths can be taken when the program is actually executed. Another approach is via simulation of programs. In such schemes, the processing unit is simulated in a software environment, and the program is executed in the simulation environment. A further approach to addressing race detection schemes is a parametric approach that tries to parameterize the access behavior for all the threads. However, all these approaches for race detection are not well suited to handle cases where thousands of threads could potentially be executing simultaneously. In other words, these approaches do not scale well as the number of threads increase. Additionally, schemes using simulation may not give a true analysis of race conditions when executing the program on the actual hardware because the simulated environment is not hardware based.

Another common problem for applications that report data access hazards includes the high rate of false positives (e.g., false reports of data access hazards that cause races). This occurs when information about the hazard of interest to the user is hidden among other hazard reports. This is of an increasing concern when a large number of concurrent threads are executing a program.

Also, data access hazard reports produced by race detection applications tend to be voluminous and the information presented within them can be unnecessarily redundant. For example, a hazard detection application could for example potentially produce several million hazard lines for an application that has thousands of threads, even though there may actually only be a few number of sources that may be responsible for the hazards. Further, because hazard information scales with the number of threads that are participating, the resulting output generated usually requires significant manual parsing effort on the part of the user. With the large amounts of output and no way to prioritize between the reported hazard information, conventional race analysis applications can be cumbersome and inefficient to use, requiring significant time on the part of the user to distill down all the information in the data access hazard reports to identify the meaningful entries.

SUMMARY

Accordingly what is needed is a race detection and analysis method and system to identify programmed ordered races in an application and automatically parse through and synthesize the information in the data access hazard report generated by the race detection application. Further, what is needed is a race analysis application that uses the synthesized information to prioritize the hazards of interest to a user.

In one embodiment, a method for analyzing race conditions between multiple threads of an application is presented. The method comprises accessing hazard records for an application under test. It further comprises creating a graph comprising a plurality of vertices and a plurality of edges using the hazard records, wherein each vertex of the graph comprises information about a code location of a hazard and wherein each edge of the graph comprises hazard information between one or more vertices. Additionally, it comprises assigning each edge with a weight, wherein the weight depends on a number and relative priority of hazards associated with a respective edge. Finally, it comprises traversing the graph to report an analysis record for each hazard represented in the graph.

In another embodiment, a computer-readable storage medium having stored thereon, computer executable instructions that, if executed by a computer system cause the computer system to perform a method for analyzing race conditions between multiple threads of an application is disclosed. The method comprises accessing hazard records for an application under test. It further comprises creating a graph comprising a plurality of vertices and a plurality of edges using the hazard records, wherein each vertex of the graph comprises information about a code location of a hazard and wherein each edge of the graph comprises hazard information between one or more vertices. Additionally, it comprises assigning each edge with a weight, wherein the weight depends on a number and relative priority of hazards associated with a respective edge. Finally, it comprises traversing the graph to report an analysis record for each hazard represented in the graph.

Finally, in one embodiment, a system for analyzing race conditions between multiple threads of an application is presented. The system comprises a memory comprising a development environment stored therein, wherein the development environment comprises a race analysis application operable to debug an application under test. The system also comprises a processor coupled to the memory, the processor being configured to operate in accordance with the race analysis application to: (a) access hazard records for an application under test; (b) create a graph comprising a plurality of vertices and a plurality of edges using the hazard records, wherein each vertex of the graph comprises information about a code location of a hazard and wherein each edge of the graph comprises hazard information between one or more vertices; (c) assign each edge with a weight, wherein the weight depends on a number and relative priority of hazards associated with a respective edge; and (d) traverse said graph to report an analysis record for each hazard represented in said graph.

The following detailed description together with the accompanying drawings will provide a better understanding of the nature and advantages of the present invention.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 7A-7H are block diagrams illustrating an exemplary analysis and reporting of analysis records from an exemplary graph created in accordance with one embodiment of the present invention.

DESCRIPTION

Figure 1:
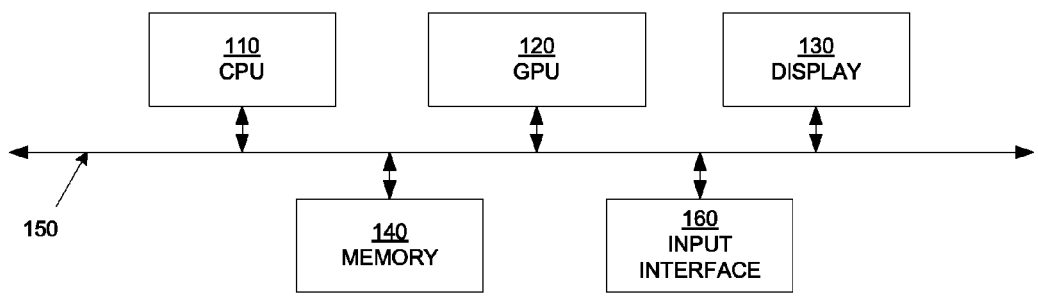
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "creating," "assigning," "analyzing, "identifying," "determining," "parsing," "creating," "connecting," "computing," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

Flowcharts are provided of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 10 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Grouping and Analysis of Data Access Hazard Reports

Figure 2:
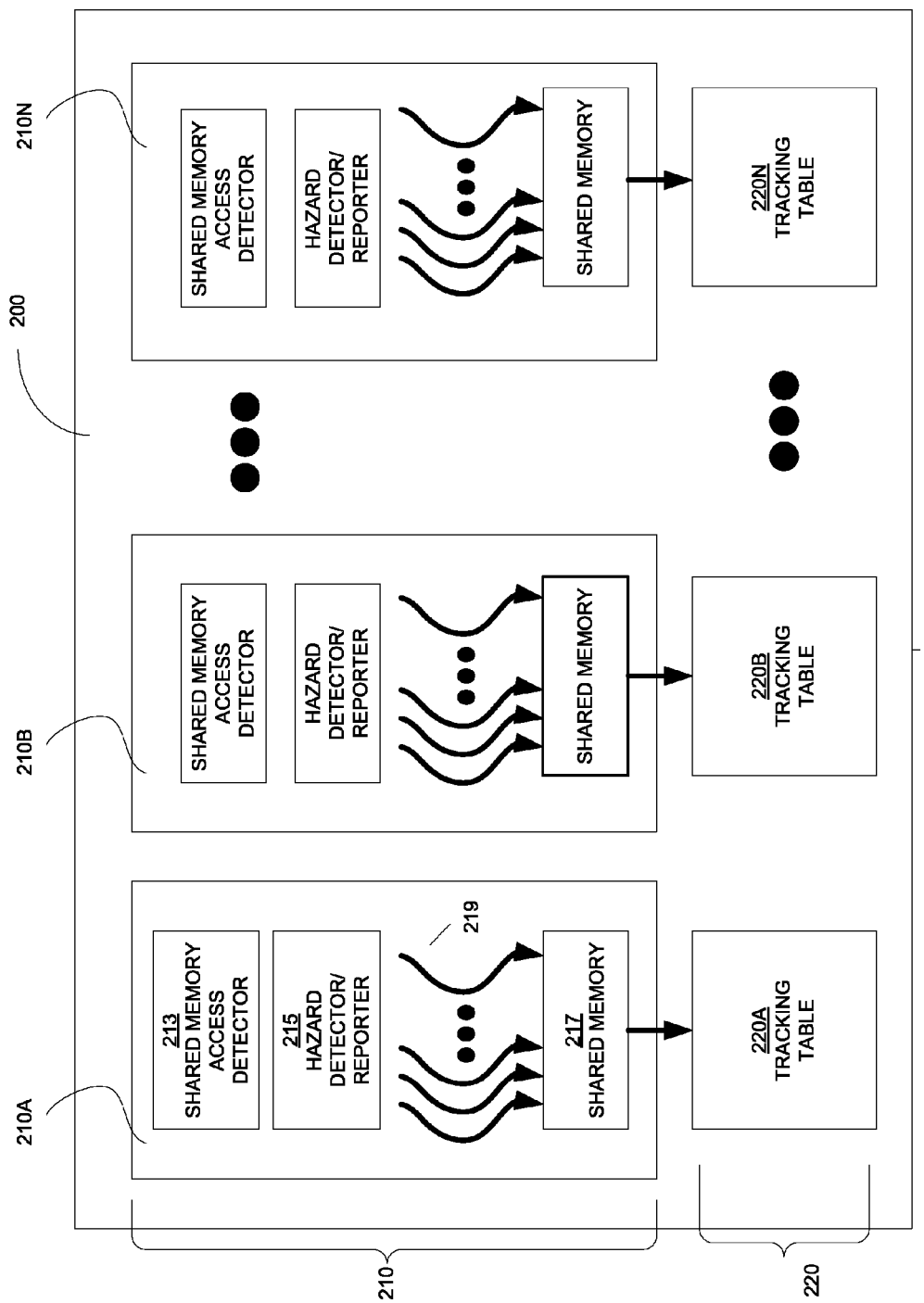
FIG. 2 is a block diagram of an exemplary multi-threaded processing system configured to implement online detection of race conditions in executable code of a program, in accordance with one embodiment of the present disclosure.

FIG. 2 is a block diagram of an exemplary multi-threaded processing system 200 configured to implement online detection of race conditions in executable code of a program, in accordance with one embodiment of the present disclosure. The processing system 200 may be implemented within system 100 of FIG. 1, in embodiments of the present invention.

As shown in FIG. 2, a processing system 200 includes a plurality of units of hardware or block processors 210, including block processor 210A, 210 B, and on up to 210N. For instance, processing system 200 may comprise a central processing unit (CPU), graphics processing unit (GPU), general purpose graphics processing unit (GPGPU), etc. In a multi-threaded environment, each block processor is configured to perform specialized functions or general purpose instruction, and may include various types of memory and a tracking table. Additionally, each block processor is configured to concurrently execute a group or block of threads also known as cooperative thread arrays (CTAs). For instance, each block multi-processor may comprise one or more stream processors, each of which handles one or more threads in a group of threads that is assigned to a particular block by a scheduler (not shown) or operating system (not shown). Multiple CTAs can execute on a single block processor. In one implementation, a warp size defines the group or number of threads that are running concurrently within a block processor. In one embodiment, a block processor may be a shader multi-processor, which is a component of a GPU.

For illustration, each block processor may include various components, such as, arithmetic logic unit (not shown), branching units (not shown), etc. As a representative example of the block processors in the plurality of block processors 210, the components of block processor 210A are described. For instance, block processor 210A is assigned shared memory 217 used for executing instructions in a program. That is, shared memory is included that can be read or written to by any thread as executed by the block processor 210A. For instance, a group, block, or warp of threads 219 of execution are assigned to block 210A and have access to locations in shared memory 217. In one embodiment, shared memory is located in block processor 210A. In another embodiment, shared memory is located outside block processor 210A, but within processing system 200. In still another embodiment, shared memory 217 is separately or remotely located.

Additionally, processing system 200 includes a plurality of tracking tables 220. In particular, each block processor is associated with a corresponding tracking table in a one-to-one relationship, in one embodiment. For instance, block processor 210A is associated with tracking table 220A, block processor 210B is associated with tracking table 220B, and block processor 210N is associated with tracking table 220N. In another embodiment, a tracking table is universal to the block processors, in that any tracking table may be used by a block processor for purposes of detecting online shared memory hazards.

Moreover, the tracking table 220A includes information that is used to determine multiple accesses to a particular location in shared memory 217 for block processor 210A. For instance, an initialization bit is included within tracking table 220A for a corresponding location (e.g., byte of memory) in shared memory 217 that is assigned to block processor 210A. Embodiments of the present invention support various sizes of the locations in shared memory. Additional information related to accesses to locations in shared memory 217 may be included within tracking table 220A, such as, type of access to a particular location, thread index, etc.

In addition, each block processor includes various components configured to perform online detection of race conditions or shared memory hazards. As shown in FIG. 2, one or more threads 219 possibly may access the same location in shared memory 217. Two or more accesses to a location in shared memory creates a hazard condition in that the order of execution between the two threads is not guaranteed in hardware. This may create results that may not be replicated. For instance, as a representative block for the plurality of blocks 210, block processor 210A includes a shared memory access detector 213 and hazard detector/reporter 215. More particularly, the shared memory access detector 213 in block processor 210A is configured to identify a second access to a location in shared memory 217 between a first and second thread of a block or warp of threads. The initialization bit is used to detect a potential hazard when a second access to the shared memory occurs, since the bit is set prior to the second access.

Two or more accesses to the location are associated with instructions of a program located within a barrier region of the program. Specifically, synchronization points of a program guarantee that all threads of any given block have completed execution up to that point. Synchronization points include the entry of a program, one or more exit of program, block wide synchronization primitive barrier instructions, etc. Entry and exit points provide implicit synchronization, whereas barrier instructions provide for explicit synchronization.

In addition, each block processor includes a hazard detector/hazard reporter. For instance, block processor 210A includes hazard detector/reporter 215. The hazard detector/reporter 215 is configured to determine a shared memory hazard based on a first type of access associated with a first access to the location and a second type of access associated with a second access to the location. The types of first and second accesses include reads and writes to the location. The reporting portion of the hazard detector/reporter 215 is configured to determine information associated with the current instruction, and to report the hazard including information related to the hazard. In one embodiment, the information is used to attribute or identify the instruction causing the hazard, such as, program counter, the instruction, the thread and block indices, an address associated with the location in shared memory, etc.

The processes and systems used to detect and report out shared memory data access hazards have been described in detail in the following: U.S. patent application Ser. No. 13/728,990, entitled "METHOD AND SYSTEM FOR RUN TIME DETECTION OF SHARED MEMORY DATA ACCESS HAZARDS,", having a filing date of Dec. 27, 2012, which is herein incorporated by reference in its entirety, and U.S. patent application Ser. No. 13/728,968, entitled "METHOD AND SYSTEM FOR HETEROGENEOUS FILTERING FRAMEWORK FOR SHARED MEMORY DATA ACCESS HAZARD REPORTS,"having a filing date of Dec. 27, 2012, which is herein incorporated by reference in its entirety.

Accordingly, embodiments of the present invention provide for a race detection and analysis method and system that identify programmed ordered races in an application and automatically parse through, synthesize and group the information in the data access hazard report into a compact and meaningful format. Further, embodiments of the present invention provide for a race analysis system and method that uses the synthesized information to prioritize the most relevant hazards to the developer.

Figure 3:
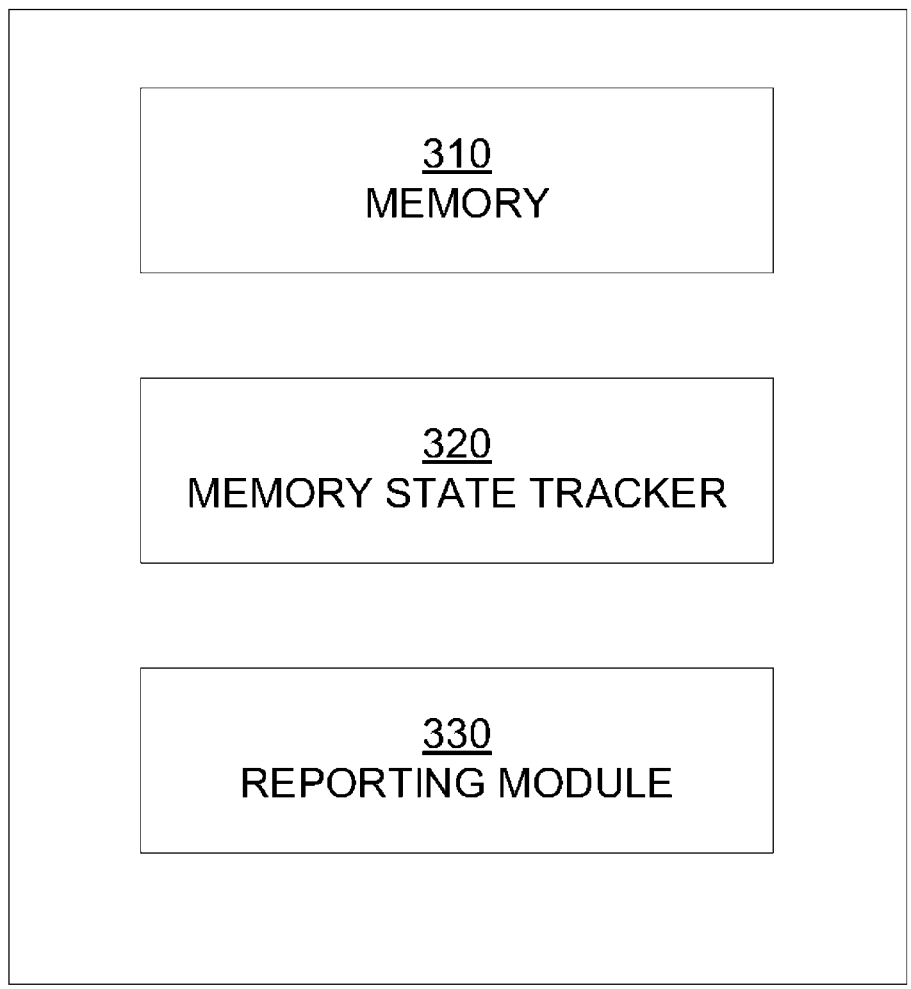
FIG. 3 illustrates a framework for detecting and reporting race conditions in a multi-threaded program, in accordance with one embodiment of the present disclosure.

In FIG. 3, a framework 300 is described for detecting and reporting race conditions in a multi-threaded program in accordance with one embodiment of the present disclosure. The framework 300 includes memory space 310, memory state tracker 320, and reporting module 330. The framework is designed to detect three types of race conditions, as follows: 1) write-after-write (WAW) race; 2) read-after-write (RAW) race; and 3) write-after-read (WAR) race.

As shown, memory space 310 is used for storing housekeeping information. In one embodiment, the size of the memory space is constant irrespective of the number of instructions executed by the threads in the program. In one embodiment, as the number of threads in the program (N) grows, the space overhead for housekeeping information grows by a factor log(N). This is in contrast to previous efforts where the space overhead increases by a factor N.

Memory state tracker 320 tracks the housekeeping information relating to shared memory, and stores that information into memory space 310. The housekeeping information is tracked and stored per unit of shared memory. In one embodiment, the size of the unit of shared memory is configurable and is inversely proportional to the space overhead of the scheme. It is also directly proportional to the probability of reporting a false positive, with zero false positives reported when the unit size is one byte. For example, if the unit size is four bytes, then accesses to different bytes within the same unit may be falsely reported as a race.

The framework 300 is configured to report the threads participating in the race using the reporting module 330. Reporting module 330 compiles the information from the hazard detector/reporter modules 215 of block processors 210A-210N. The reporting module 330 is configured to report, among other things as will be discussed further below, the source code locations for the memory accesses involved in a corresponding race condition.

In one embodiment, in order to track WAR/RAW/WAW race conditions, it is sufficient to store information for up to two threads that are accessing each unit of shared memory. That is, it is sufficient to store information for up to any two threads accessing a unit of shared memory. For instance, a RAW or WAR race condition for a particular unit of shared memory is detectable when there are up to two different threads: one thread that reads from the location or unit of shared memory; and one thread that writes to the unit of shared memory. Also, a WAW race condition can be detected when there are two threads that write to a location or unit of shared memory.

Accordingly, hazards are reported by reporting module 330, in one embodiment, as tuple records which comprise two access locations, e.g., program counters (PCs) and source file and line mapping for each PC, etc. as well as an edge with data, e.g., hazard type, filter criteria associated with the hazard, etc.

The reporting module 330 is configured to generate a data access hazard report that can comprise information about the type of hazard, e.g., RAW, WAW or WAR. The data access hazard report can further comprise information about the relative importance for each hazard, any heuristic filter that would apply and the values of the respective heuristics. Additionally, it can comprise information about the priority of the hazard, the values of the file and line number where each of the threads causing the violation is located, and the value of the two sites (PCs) where the hazard originated. It also comprises the thread indices and block indices to identify the two threads that may potentially perform the two accesses resulting in a race condition.

As discussed above, the hazard report can, for example, potentially comprise millions of hazard lines for an application that has thousands of threads because a hazard line is produced for every instance a hazard occurs. Accordingly, the hazard report can include many redundancies. Further, the hazard report can comprise information regarding several lower priority hazards that a developer may typically be uninterested in addressing. For example, there may be thousands of read operations that may be dependent on a single write operation that may result in a separate RAW race condition for each respective read operation. The data access hazard report would comprise a separate hazard line corresponding to each of the thousands of read operations even though only a single dependency on a write operation is responsible for causing the hazard. In this case, much of the information contained in the hazard report will not be as relevant to a user. The user only needs to be informed to break the order between the critical write operation and the dependent read operations in order to ensure that the program is hazard free.

The race analysis application of present invention, therefore, provides a system and method that synthesizes the information from a hazard report into a format that is useful for a developer without requiring manual parsing. In one embodiment, the present invention can identify the precise source line and source location of the thread access causing the hazard. By reporting the precise location of a hazard within the code, the present invention addresses the problem of reporting false positives.

In addition, the race analysis application of the present invention can analyze and convert the pair wise hazards reported in the hazard report into one or more clusters effectively. Further, it can use the metrics assigned to each hazard and also the nature of execution of the application to prioritize the clusters as well as the portions of a cluster. This makes it easier to manage the priorities of the various hazards reported. By distilling the numerous entries in the hazard report down to a few critical ones, the present invention allows the user to focus on the higher priority hazards first.

Figure 4:
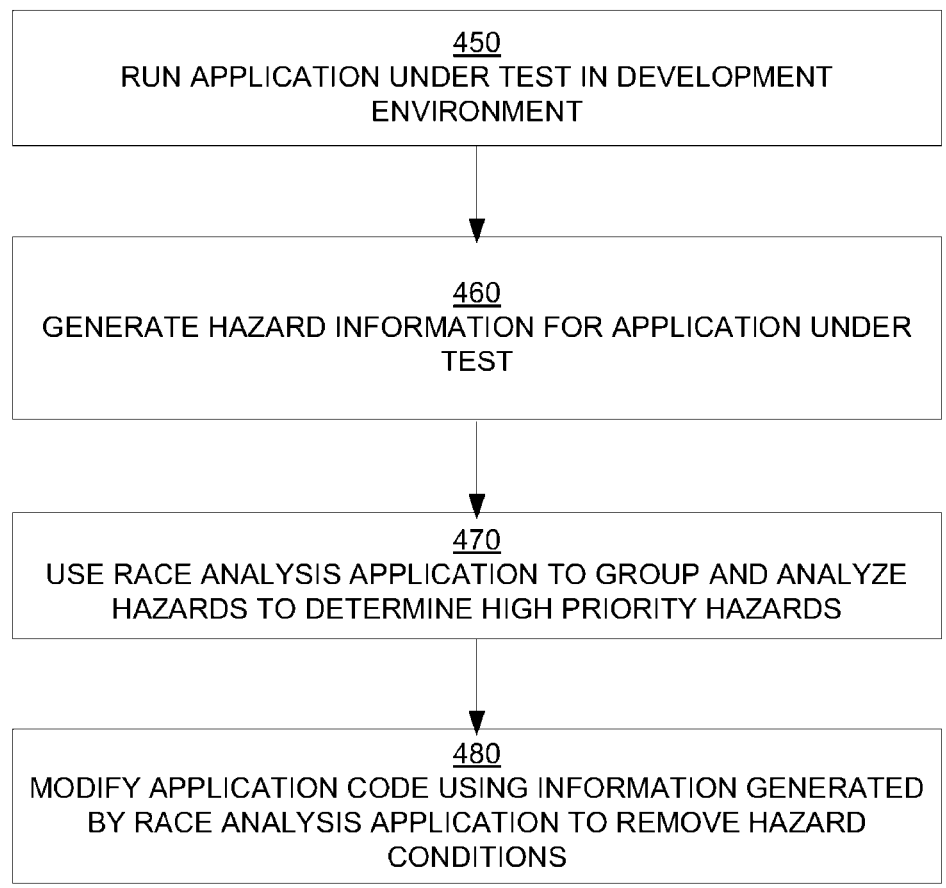
FIG. 4 is a flow diagram illustrating an exemplary computer implemented process for debugging an application using the race analysis application in accordance with one embodiment of the present invention.

FIG. 4 is a flow diagram illustrating an exemplary computer implemented process for debugging an application using a race analysis application in accordance with one embodiment of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 4 should not be construed as limiting the scope of the invention. Rather, it will be apparent to persons skilled in the relevant art(s) from the teachings provided herein that other functional flows are within the scope and spirit of the present invention. Flowchart 400 may be described with continued reference to exemplary embodiments described above, though the method is not limited to those embodiments.

At step 450, the user developer runs the application under test using the development environment comprising the race analysis application. In one embodiment, the user can run the application under test on a GPU. At step 460, hazard information is reported out in a data access hazard report by reporting module 330 as discussed above. The hazard report is used at step 470 by the race analysis application of the present invention to group and analyze hazards to determine the relative hazard priorities. These hazard priorities are then reported out to the developer. In one embodiment, the hazards are reported out on the GPU and then read out to the CPU, where the race analysis application analyzes them in accordance with an embodiment of the present invention. At step 480, the developer can modify the application code in accordance with the information reported out by the race analysis application. Using the information, the developer can target the higher priority hazards first and remove them to debug the application.

In order to group and analyze all the hazard records, the present invention first synthesizes all the information by building a graph that represents the information from the data access hazard report in a more compact and organized fashion.

Figure 5:
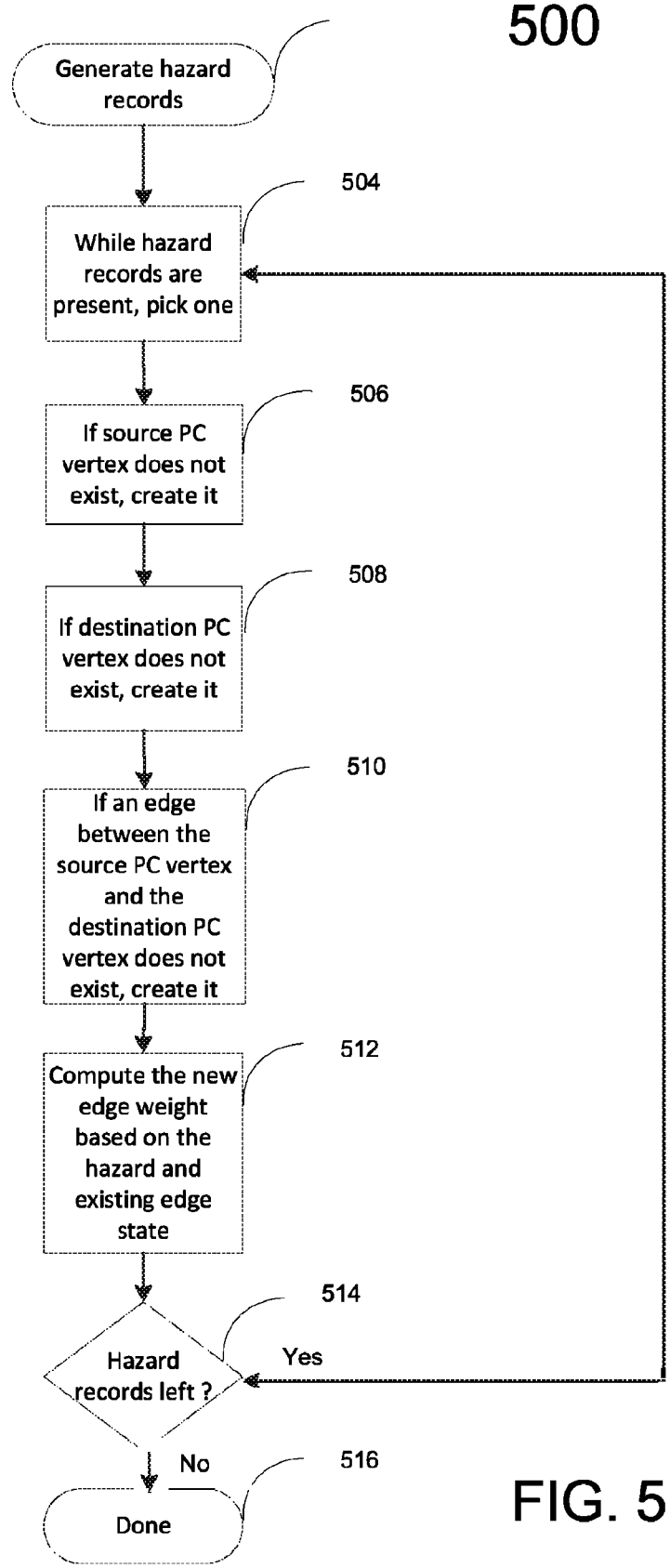
FIG. 5 is a flow diagram illustrating an exemplary computed implemented method for generating a graph from the list of hazard records generated in the data access hazard report in accordance with one embodiment of the present invention.

FIG. 5 is a flow diagram illustrating an exemplary computer implemented method for generating a graph from the list of hazard records generated in the data access hazard report in accordance with one embodiment of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 5 should not be construed as limiting the scope of the invention. Rather, it will be apparent to persons skilled in the relevant art(s) from the teachings provided herein that other functional flows are within the scope and spirit of the present invention. Flowchart 500 may be described with continued reference to exemplary embodiments described above, though the method is not limited to those embodiments.

At step 502, a data access hazard report is generated using the reporting module 330 from FIG. 3. Using the hazard report generated at step 502, steps 504 to 514 are executed while there are hazard records present in the data access hazard report to generate a graph synthesizing the information from the hazard report. This graph is an undirected graph, wherein the vertices of the graph correspond to code locations (GPU PCs) and edges between two vertices represent the hazard between the two code locations. The graph is empty when step 504 is first encountered. Steps 504 to 514 are executed for each hazard record reported in the hazard report in order to create the undirected graph. These steps can be executed once one or more hazard reports have been generated and the data has been flushed back to the host, e.g., once the data has been read back to the CPU from the GPU.

At step 506, a hazard record from the hazard report is parsed through to determine whether a vertex in the graph has been created for the source PC of the hazard. If a source vertex corresponding to that particular source PC does not exist, it is created. This vertex now corresponds to a source location where a hazard started. This is one of the two potential access locations resulting in the hazard. The race analysis application of the present invention will then add information concerning the source access location to the created vertex. For example, the vertex may, among other things, receive information regarding the thread that performed the access, the type of access performed, the PC value, and the file name and line number of the location where the access came from.

At step 508, a similar process to step 506 is performed for the destination location of the hazard. If a destination vertex corresponding to the destination PC of the hazard record from step 506 does not exist, it is created. Further, information regarding the destination access location is added to the destination vertex at step 408.

For both steps 506 and 508, if either the source or destination vertex has already been created, e.g., if the source or destination PC of the hazard is implicated in multiple hazards, the additional information from the recent hazard record is simply added in to the vertex that has already been created.

At step 510, if an edge between the source vertex and destination vertex does not exist, it is created. Each edge is assigned an initial weight. This edge can be annotated with information from the hazard report about the relative priority of the hazard, the type of hazard, the address the hazard occurred on, the name of the kernel, the block indices etc. Similar to the vertices, no edges are recreated. If an edge already exists because a hazard has already been reported between its source and destination vertex previously, the information regarding the new hazard record is simply added to the edge.

If the edge from step 510 already exists, then at step 512, the race analysis application will compute the new edge weight based on the hazard and existing edge state. Further, the edge is reweighted in accordance with information regarding the priority of the hazard added to the edge. As the new information gets tagged into the vertices and edges, the edges carry forward the information about the priorities of the hazards and that information is used to continuously re-compute the weight of the edges.

Accordingly, one edge or line can have multiple hazards associated with it. One vertex can potentially represent thousands of individual lines from the hazard report, and each of these edges can represent thousands of hazard records. In this way, voluminous amounts of information in the hazard report can be reduced to a manageable format while still maintaining the relevant information. A hazard report with, for example, thousands of lines of reported hazards may be synthesized into a graph with less than ten vertices. This graph can then be analyzed much more efficiently and rapidly than a hazard report with several thousand entries.

At step 514, the application will check to determine if any hazard records remain to be reviewed in the data access hazard report. If there are records remaining, steps 504 through 514 are repeated for each of those records. If not, the procedure is done and the resultant graph can now be analyzed to ascertain the relative priorities of the hazards.

Figure 6:
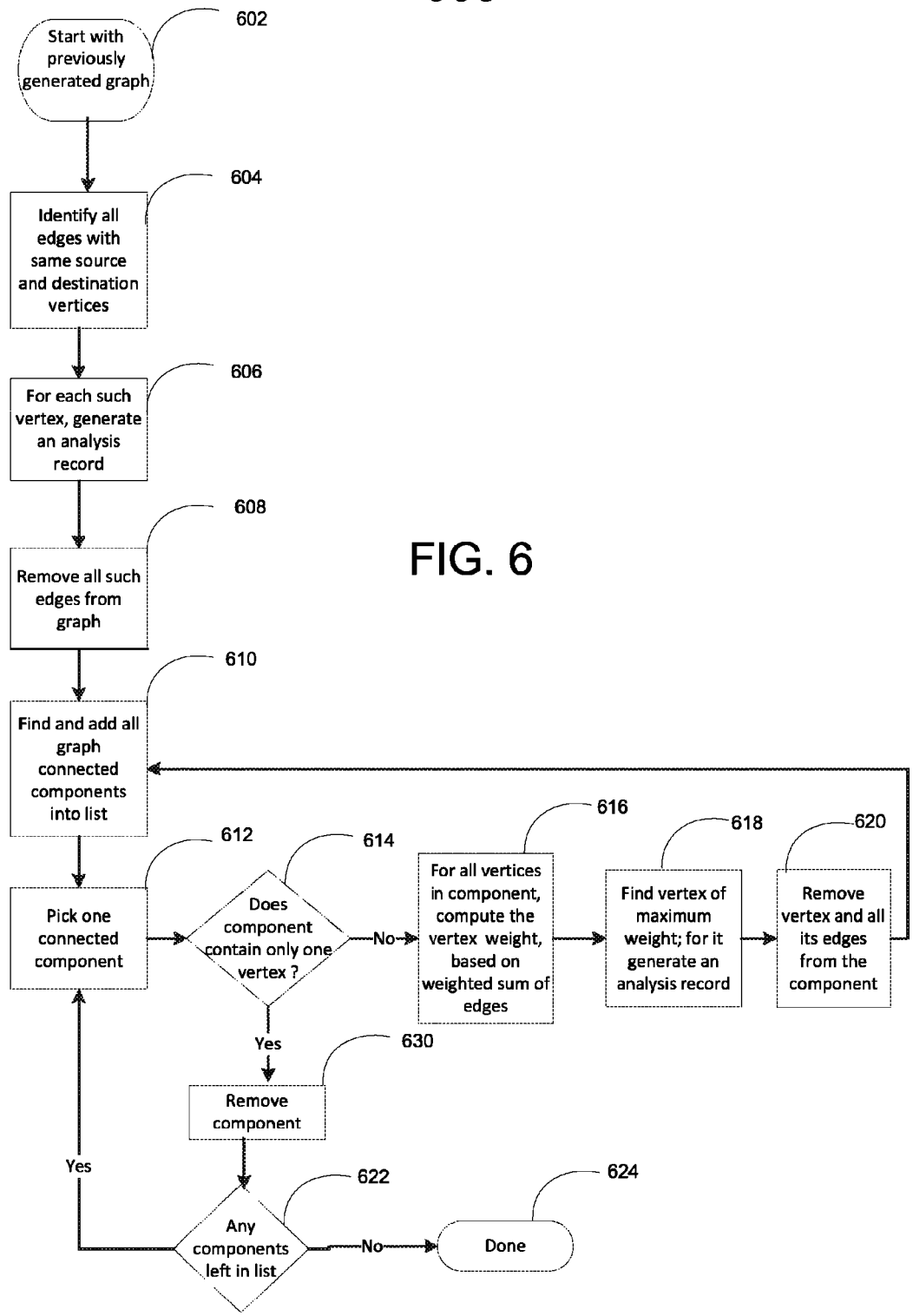
FIG. 6 is a flow diagram illustrating an exemplary computer implemented method for analyzing the graph to report out analysis records for hazards in the graph in accordance with one embodiment of the present invention.

FIG. 6 is a flow diagram illustrating an exemplary computer implemented method for analyzing the graph to report out analysis records for hazards in the graph in accordance with one embodiment of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. Flowchart 600 may be described with continued reference to exemplary embodiments described above, though the method is not limited to those embodiments.

At step 602, the race analysis application accesses the graph that was generated as a result of the procedure described in flowchart 500 in order to begin the analysis process.

At step 604, the application identifies all the edges in the graph with the same source and destination vertices. Stated differently, the application first identifies all the self-loops in the graph. A self-loop is a hazard resulting from the same line of code in the application. Both ends of the hazard resulting in a self-loop comprise the same location in the code. For example, a WAW violation is a type of hazard that could result in a self-loop. The same line of code in two different threads trying to access the same memory location to perform a write may cause a WAW violation where the program order is not defined. This results in a self-loop because the vertices in the graph correspond to access locations and a hazard resulting in a self-loop has identical source and destination access locations.

At step 606, for each vertex with a self-loop, an analysis record is generated. The analysis record generated for the self-loop comprises, among other things, information about the self-loop, the vertex it is related to, and all the neighbors of that vertex. It also includes an alert to the user to fix this self-loop to eliminate the hazard. Further, it includes information about the priority level associated with the self-loop.

The weight of the self-loop edge is used to determine the priority level associated with the hazard. This priority level is used to determine in what order the hazards should be reported to the user. In some cases, for example, the hazard information may not be as relevant to the user. In fact, the user in some cases may be aware of the hazard causing activity and have intended it. For example, if the two access locations in a pair threads resulting in a self-loop hazard in a graph are accessing data which is common to both the threads, the hazard being reported based on that self-loop would be of a lower priority because both threads would be writing the same data to the memory location. In this case, this particular self-loop edge would have a relatively low weight. Therefore, it is important that the race analysis application keeps tracks of the priorities of the hazards, so it can prioritize the reporting of information about the hazard to the developer. In the example above, for instance, the hazard would be of a lesser priority to the user and, as a result, would be reported further down in the analysis reports from other higher priority hazards.

In one embodiment, the analysis report assigns various alert levels to the hazards reported. A hazard could be categorized as an error, a warning or an informational alert. The low priority hazard in the example above, for instance, could be categorized as an informational alert. The user developer can therefore choose to ignore such low level informational alerts. Thus, the race analysis tool helps reduce false positives and allows the user to focus on only the high priority hazards.

For each of the self-loops in the graph, the analysis application will keep track of the respective analysis record generated in response to each self-loop. It does not, however, report the analysis records out to the user until all the vertices and edges in the graph have been analyzed.

At step 608, as each of the self-loops is analyzed, the race analysis application will remove the respective edge associated with the self-loop. The race analysis application identifies and analyzes the self-loops before the other types of hazards because removing the self-loops from the graph converts it from being cyclic to acyclic. The resultant acyclic characteristic of the graph makes it easier for the race analysis procedure to effectively perform a component traversal and reduction.

In one embodiment, the race analysis application implements the procedure of reducing the graph by keeping an in-memory representation of the graph using a graphic library. This library, in effect, takes snapshots of the graph at the various stages. This allows the elements of the graph to be hidden as it is reduced down while maintaining all the information in memory. As a result, the component traversal can ignore the hidden elements but none of the information is ever lost.

At step 610, the race analysis application finds and adds all the graph connected components into a list. Stated differently, the race analysis application attempts to identify clusters and add the information regarding the clusters into a list. All the connected components in the graph are related to hazards that involve two different accesses locations. For example, a pair of vertices in the graph could be related to hazards involving multiple read operations and a single write operation with an incorrect address. These types of hazards can be easily identified using the graphical form. Step 610 therefore entails breaking the graph into connected components using a breadth first search.

In one embodiment, the graph can be broken up into connected components using a depth first search. A breadth first search is faster than a depth first search, however, it may require more memory. A depth first search, on the other hand, is slower because it needs to traverse the entire depth of the graph but requires less memory.

Typically, in a search, the procedure analyzes each new vertex or element it encounters and determines the cluster each respective vertex belongs to. To analyze a vertex, the procedure determines each neighboring component that the vertex is connected to and continues on to determine all the components that the neighboring components are connected to as well. It repeats this procedure until it has identified the entire cluster to which a given vertex belongs. If, however, the search reaches a vertex that it has already encountered while identifying a prior cluster, it simply associates the vertex with the cluster that has already been identified.

At step 612, after all the components of the graph have been added into a list, the procedure chooses and analyzes one of the components from the list. In one embodiment, the procedure can choose all the trivial components first. A trivial component is a cluster that has only one vertex that is not connected to any other vertex and does not have any self-loops. In another embodiment, the procedure can choose the components in the order of their appearance in the list.

At step 614, the procedure determines whether the component being analyzed comprises only one vertex. Typically, when the edges associated with the self-loops are removed at step 608, several single vertices may be left behind that do not connect to any other vertices. Because the analysis records for the self-loops have previously been generated at step 606, the trivial components are no longer relevant. They do not contain any further information that needs to be propagated further. Consequently, at step 630, the trivial component is removed.

Subsequently, at step 622, the procedure once again checks to determine if there are any further components left in the list and repeats the procedure starting at step 612 for any such components. If there are no more components left in the list, then the procedure finishes at step 624.

If the component chosen at step 612 is not a trivial component, then at step 616, the vertex weight is calculated for all the vertices in the component based on the weighted sum of edges. Stated differently, a vertex weight is calculated for all the vertices in the cluster based on the weight of the edges to which each respective vertex is connected. As explained above, each edge has a weight associated with it based on the hazard and the relative priority of the hazard that the edge defines.

Once the vertex weight is determined for all the vertices in the cluster, the vertex of maximum weight in the cluster is determined at step 618 and an analysis record is generated for that vertex. The analysis record generated can comprise, among other things, information about the vertex, the hazard it is related to, and information about all the neighbors of that vertex. Similar to step 606, however, the race analysis application will keep track of the respective analysis records, but does not report the analysis records out to the user until all the vertices and edges in the graph have been analyzed.

At step 620, the vertex of maximum weight is removed from the cluster since all the information pertaining to it has been collected and the procedure is repeated for the remaining vertices starting at step 610.

After procedure 600 has run its course at step 624, the analysis records can be printed to the end user. The analysis records can comprise information regarding the types of access, the conflicting accesses that have taken place, address ranges of the conflicting accesses, file names and line numbers of the accesses, names of the functions that performed the access, and the priority of the hazards. In one embodiment, the analysis records can be printed in order of priority, wherein the hazards of the highest priority are printed out first.

Using the analysis records, the user can identify all the locations in the application where hazards occur. The user can then insert explicit program orders at these locations to break off all the race conditions.

In one embodiment, an analysis report can also be generated for the user with other statistical information such as the number of threads that caused the hazard, the total number of hazards etc.

One of the advantages of the procedure 600 is that it is linear to the number of vertices and the number of edges in the graph. In other words, the procedure does not require more iterations than the number of vertices and edges present in the graph initially.

The approach taken by the race analysis application of the present invention is also time efficient and keeps track of the unique types of hazards. The relative priority of hazards is maintained while it becomes easy to identify code sections that are potentially the source of multiple conflicts. By collapsing information from multiple threads, blocks and grids into an edge weight and by using heuristic criteria, this approach can drastically reduce the amount of information that a developer must examine to identify the data races in their application.

In a different embodiment, a max-flow min-cut procedure could be followed to partition the graph into clusters. A max-flow min-cut technique is a well-known procedure, whereby which, a minimum cut is computed over the entire graph such that the graph is partitioned into several trivial graphs. The computation in max-flow min-cut approach, however, can be square in the number of edges as opposed to the linear procedure detailed in flowchart 600.

FIGS. 7A-7H are block diagrams illustrating an exemplary analysis and reporting of analysis records from an exemplary graph created in accordance with one embodiment of the present invention.

Figure 7A:
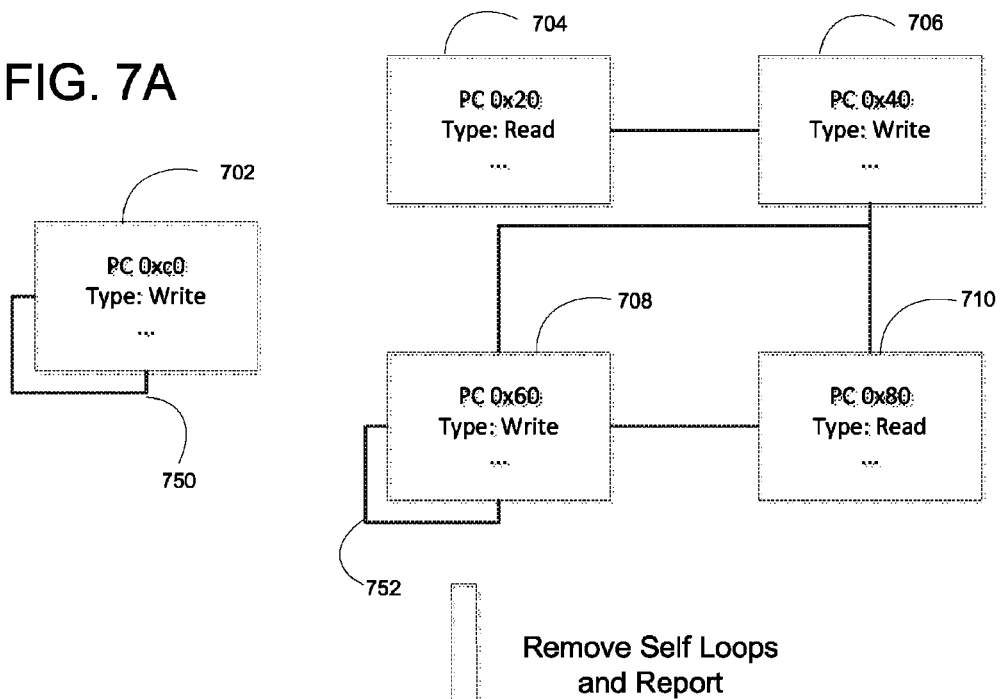

FIG. 7A illustrates the graph before being analyzed. The race analysis application first identifies all edges with the same source and destination vertex. Both edges 750 and 752 will be identified as self-loops by the application. Vertex 702 is associated with self-loop 750 while vertex 708 is associated with the self-loop 752.

After the analysis records in memory have been generated for vertices 702 and 708, both edges 750 and 752 are removed.

Figure 7B:
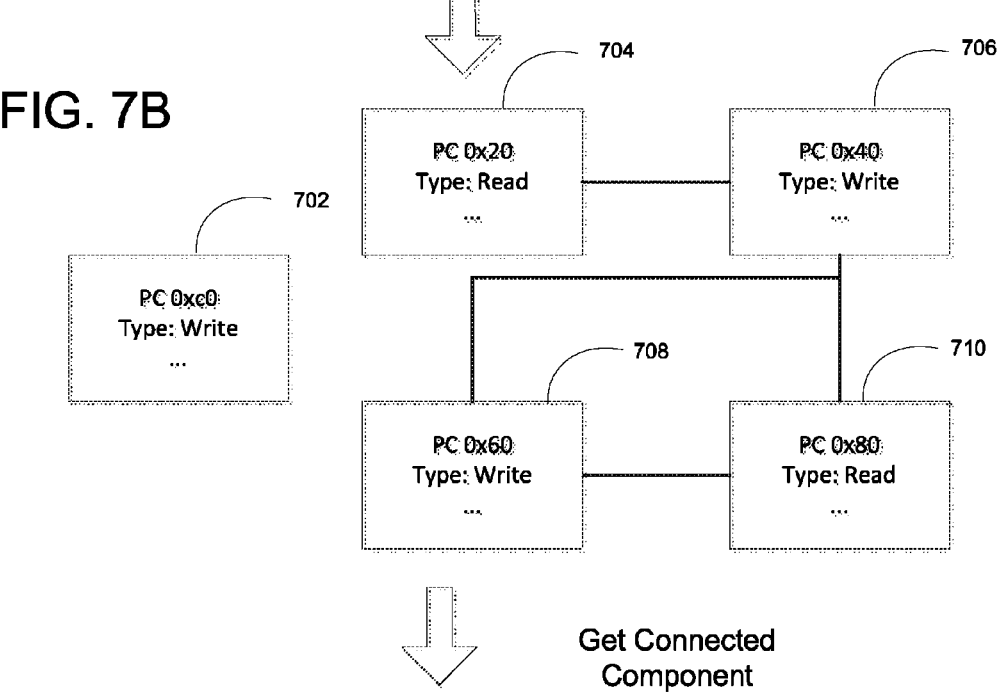

FIG. 7B is an in-memory representation of the graph after edges 750 and 752 have been removed. The application then finds and adds all connected components into a list. Vertices 704, 706, 708 and 710 all comprise one cluster and will be identified as a single connected component. Single vertex 702 will be identified as a separate connected component. Because vertex 702 is a trivial component, and all the information regarding edge 750 has previously been extracted, it can be removed from the graph as explained in association with step 630 in FIG. 6.

Figure 7C:
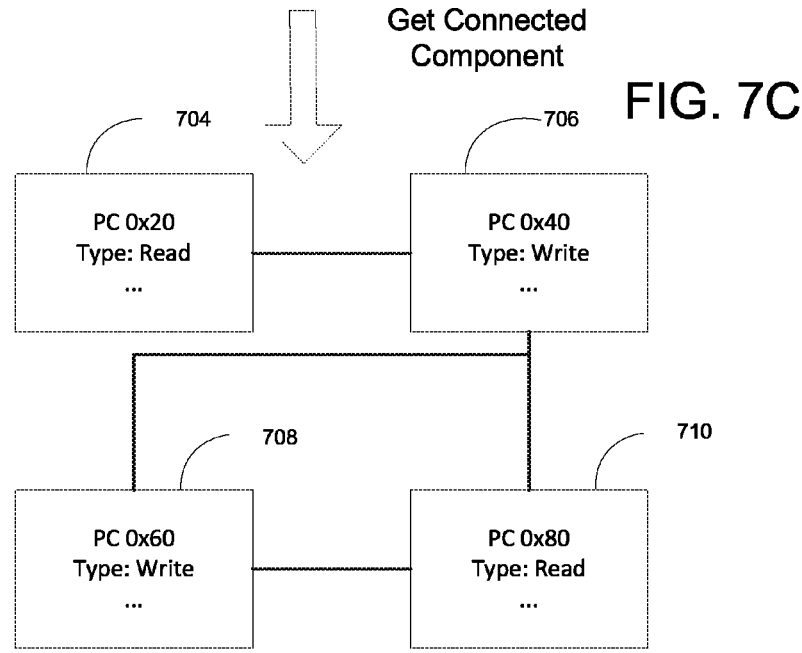

FIG. 7C is an in-memory representation of the graph after trivial component 702 is removed. Pursuant to step 616 in FIG. 6, the vertex weight is computed for all the vertices in the cluster illustrated in FIG. 7C based on the weighted sum of edges. Assuming all edges in the component of FIG. 7C carry an equal weight, vertex 706 is the maximum weight vertex because it has the most number of edges connected to it.

Figure 7D:
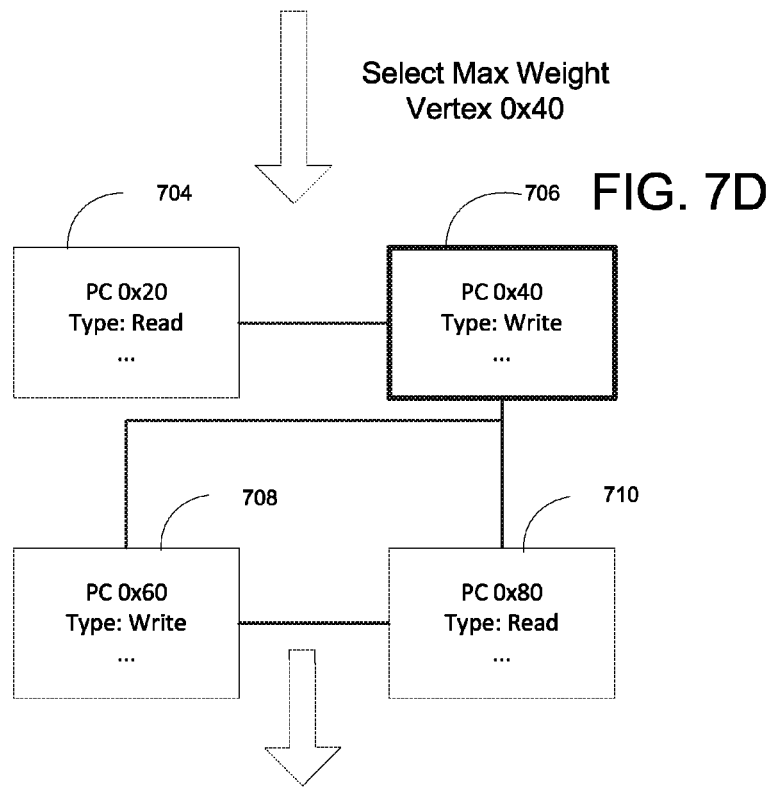

FIG. 7D is an in-memory snapshot of the graph after vertex 706 has been identified as the maximum weight vertex in the component. An analysis record is generated for vertex 706 and all the edges connected to it. Subsequently, pursuant to step 620, vertex 706 and all its connected edges are removed from the cluster.

FIG. 7E is an in-memory representation of the graph after vertex 706 has been removed and all the information regarding it has been reported. After vertex 706 is removed, the graph is again divided into two separate clusters. Accordingly, the procedure once again begins at step 610 in FIG. 6 to analyze the two components. Trivial component 704 is removed pursuant to step 630 in FIG. 6.

FIG. 7F is an in-memory representation of the graph after vertex 704 is removed. For the cluster comprising vertices 708 and 710, the vertex weight is computed for each of the vertices based on the weighted sum of the edges.

Figure 7G:
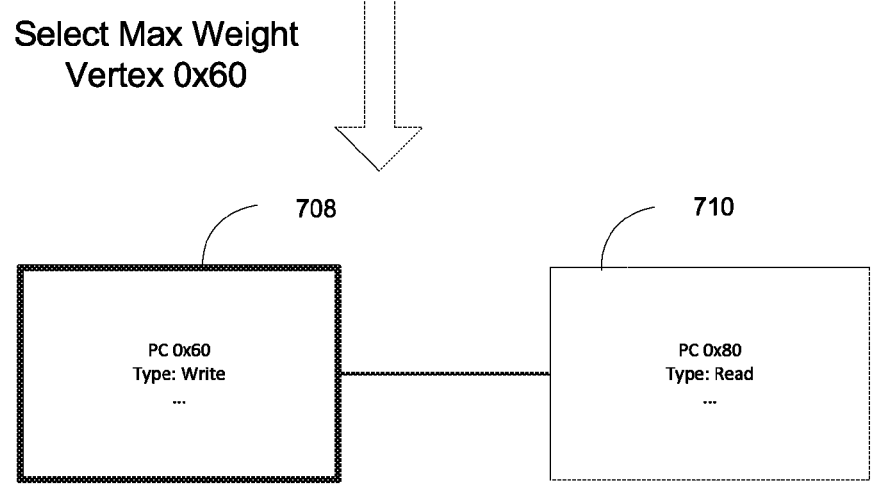

FIG. 7G is an in-memory representation of the graph after vertex 708 has been identified as the vertex of maximum weight. An analysis record for vertex 708 is generated pursuant to step 618 of FIG. 6 and the vertex is subsequently removed.

Figure 7H:
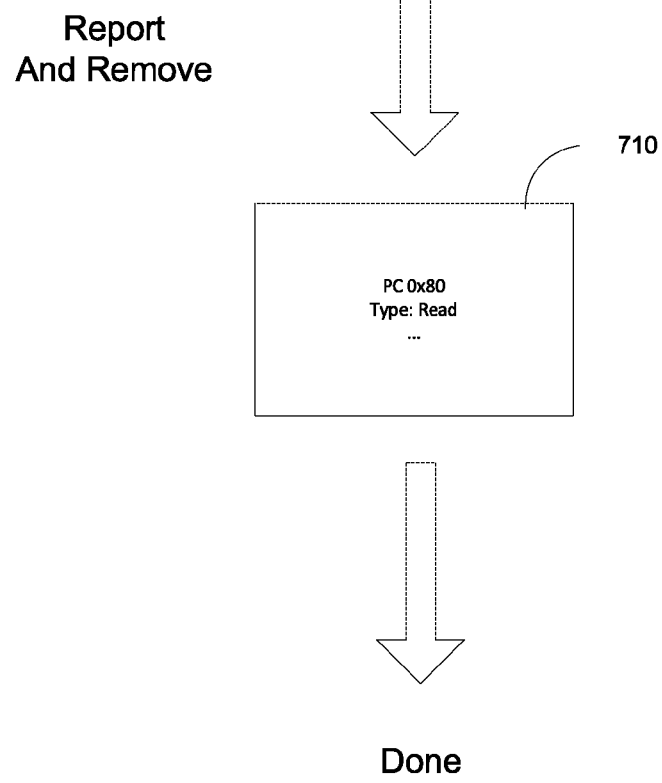

FIG. 7H is an in-memory representation of the graph after vertex 708 is removed. The graph now comprises solely of trivial component 710, which can be removed pursuant to step 630. The application is then finished analyzing the graph and the analysis records can be printed for the user, so the user can modify the application code in order to remove the hazards.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments.

What is claimed is:

1. A method for analyzing race conditions comprising:
   accessing hazard records of conflicting access between multiple threads for an application under test;
   creating a graph comprising a plurality of vertices and a plurality of edges using said hazard records, wherein each vertex of said plurality of vertices of said graph comprises information about a code location of a hazard and wherein each edge of said plurality of edges of said graph comprises hazard information between one or more vertices of said plurality of vertices;
   assigning said each edge of said plurality of edges with a respective weight, wherein said weight depends on a number and relative priority of hazards associated with said each edge; and
   traversing said graph to generate an analysis record for each hazard represented in said graph, wherein said traversing comprises analyzing each edge of said plurality of edges to determine if a first edge of said plurality of edges has a common source and destination vertex.

2. The method of claim 1, wherein said traversing further comprises:
responsive to a determination that said first edge has a common source and destination vertex:
removing said first edge from said graph; and
generating an analysis record for said first edge.

3. The method of claim 2, wherein said traversing further comprises:
partitioning said graph into a plurality of sub-graphs, wherein each sub-graph is a connected component in said graph;
adding each connected component in said graph to a list;
analyzing said connected component in said list; and
responsive to a determination that a connected component comprises a single vertex, removing said single vertex from said graph.

4. The method of claim 3, wherein said traversing further comprises:
a) for all vertices in a connected component, computing a respective vertex weight for each vertex of said vertices in said connected component;
b) finding a vertex of maximum weight within said connected component;
c) generating an analysis record for said vertex of maximum weight;
d) removing said vertex of maximum weight and associated edges from said connected component; and
repeating said (a), (b), (c) and (d) for a remainder of said connected component.

5. The method of claim 4, wherein a respective vertex weight for an associated vertex is based on a cumulative weight of all edges connected to said respective vertex.

6. The method of claim 1, wherein said creating a graph further comprises:
a) analyzing a hazard record to determine if a source vertex of said plurality of vertices corresponding to a source access location of a hazard has been created and further analyzing said hazard record to determine if a destination vertex of said plurality of vertices corresponding a destination access location of a hazard has been created;
b) responsive to a determination that said source vertex does not exist, creating said source vertex;
c) adding information concerning said hazard record to said source vertex;
d) responsive to a determination that said destination vertex does not exist, creating said destination vertex;
e) adding information concerning said hazard record to said destination vertex;
f) computing an updated edge weight for an edge located between said source vertex and said destination vertex; and
repeating said (a), (b), (c), (d), (e) and (f) for a remainder of said hazard records.

7. The method of claim 6 further comprising:
annotating said edge located between said source vertex and said destination vertex with additional information, wherein said additional information is selected from a group consisting of: a priority of a hazard associated with said hazard record; a type of said hazard; an address associated with said hazard; a name of a kernel associated with said hazard; and a block index associated with said hazard.

8. The method of claim 6, wherein said information concerning said hazard record is selected from a group consisting of: a type of thread associated with said hazard record; a type of access associated with said hazard record; a program counter value for an access location associated with said hazard record; a file name associated with an access location for said hazard record; and a line number associated with an access location for said hazard record.

9. The method of claim 1, wherein said analysis record reports hazard related information, wherein said hazard related information is selected from a group consisting of: a type of conflicting access resulting in a respective hazard; address ranges for said conflicting access; file names associated with said conflicting access; line numbers associated with said conflicting access; names of functions performing said conflicting access; and a priority associated with a respective hazard.

10. The method of claim 1, wherein said traversing is performed using a min-cut max flow procedure.

11. A non-transitory computer-readable storage medium having stored thereon, computer executable instructions that, if executed by a computer system cause the computer system to perform a method for analyzing race conditions, said method comprising:
accessing hazard records of conflicting access between multiple threads for an application under test;
creating a graph comprising a plurality of vertices and a plurality of edges using said hazard records, wherein each vertex of said plurality of vertices of said graph comprises information about a code location of a hazard and wherein each edge of said plurality of edges of said graph comprises hazard information between one or more vertices of said plurality of vertices;
assigning said each edge of said plurality of edges with a respective weight, wherein said weight depends on a number and relative priority of hazards associated with said each edge; and
traversing said graph to generate an analysis record for each hazard represented in said graph, wherein said traversing comprises analyzing each edge of said plurality of edges to determine if a first edge of said plurality of edges has a common source and destination vertex.

12. The computer-readable medium as described in claim 11, wherein said traversing further comprises:
responsive to a determination that said first edge has a common source and destination vertex:
removing said first edge from said graph; and
generating an analysis record for said first edge.

13. The computer-readable medium as described in claim 12, wherein said traversing further comprises:
partitioning said graph into a plurality of sub-graphs, wherein each sub-graph is a connected component in said graph;
adding each connected component in said graph to a list;
analyzing each connected component in said list; and
responsive to a determination that a connected component comprises a single vertex, removing said single vertex from said graph.

14. The computer-readable medium as described in claim 13, wherein said traversing further comprises:
a) for all vertices in a connected component, computing a respective vertex weight for each vertex of said vertices in said connected component;
b) finding a vertex of maximum weight within said connected component;

c) generating an analysis record for said vertex of maximum weight;

d) removing said vertex of maximum weight and associated edges from said connected component; and repeating said (a), (b), (c) and (d) for a remainder of said connected component.

15. The computer-readable medium as described in claim 14, wherein a respective vertex weight for an associated vertex is based on a cumulative weight of all edges connected to said respective vertex.

16. The computer-readable medium as described in claim 11, wherein said creating a graph further comprises:

a) analyzing a hazard record to determine if a source vertex of said plurality of vertices corresponding to a source access location of a hazard has been created and further analyzing said hazard record to determine if a destination vertex of said plurality of vertices corresponding a destination access location of a hazard has been created;

b) responsive to a determination that said source vertex does not exist, creating said source vertex;

c) adding information concerning said hazard record to said source vertex;

d) responsive to a determination that said destination vertex does not exist, creating said destination vertex;

e) adding information concerning said hazard record to said destination vertex;

f) computing an updated edge weight for an edge located between said source vertex and said destination vertex; and repeating said (a), (b), (c), (d), (e) and (f) for a remainder of said hazard records.

17. The computer-readable medium as described in claim 16 further comprising:

annotating said edge located between said source vertex and said destination vertex with additional information, wherein said additional information is selected from a group consisting of: a priority of a hazard associated with said hazard record; a type of said hazard; an address associated with said hazard; a name of a kernel associated with said hazard; and a block index associated with said hazard.

18. The computer-readable medium as described in claim 16, wherein said information concerning said hazard record is selected from a group consisting of: a type of thread associated with said hazard record; a type of access associated with said hazard record; a program counter value for an access location associated with said hazard record; a file name associated with an access location for said hazard record; and a line number associated with an access location for said hazard record.

19. The computer-readable medium as described in claim 11, wherein said analysis record reports hazard related information, wherein said hazard related information is selected from a group consisting of: a type of conflicting access resulting in a respective hazard, address ranges for said conflicting access; file names associated with said conflicting access; line numbers associated with said conflicting access; names of functions performing said conflicting access; and a priority associated with a respective hazard.

20. The computer-readable medium as described in claim 11, wherein said traversing is performed using a min-cut max flow procedure.

21. A system for analyzing race conditions comprising:

a memory comprising a development environment stored therein, wherein said development environment comprises a race analysis application operable to debug an application under test;

a processor coupled to the memory, the processor being configured to operate in accordance with the race analysis application to:

access hazard records of conflicting access between multiple threads for an application under test;

create a graph comprising a plurality of vertices and a plurality of edges using said hazard records, wherein each vertex of said plurality of vertices of said graph comprises information about a code location of a hazard and wherein each edge of said plurality of edges of said graph comprises hazard information between one or more vertices of said plurality of vertices:

assign said each edge of said plurality of edges with a respective weight, wherein said weight depends on a number and relative priority of hazards associated with said each edge; and traverse said graph to generate an analysis record for each hazard represented in said graph, wherein said traversing comprises analyzing each edge of said plurality of edges to determine if a first edge of said plurality of edges has a common source and destination vertex.

22. The system of claim 21, wherein in order to traverse said graph said processor is further configured to operate in accordance with the race analysis application to:

responsive to a determination that said first edge has a common source and destination vertex:

remove said first edge from said graph; and generate an analysis record for said first edge.

* * * * *